United States Patent
Van Duyn et al.

(10) Patent No.: US 9,115,598 B2
(45) Date of Patent: Aug. 25, 2015

(54) FRONT BEARING SUPPORT FOR A FAN DRIVE GEAR SYSTEM

(75) Inventors: Keven G. Van Duyn, Bloomfield, CT (US); James B. Coffin, Windsor, CT (US)

(73) Assignee: United Technologies Corporation, Hartford, CT (US)

( * ) Notice: Subject to any disclaimer, the term of this patent is extended or adjusted under 35 U.S.C. 154(b) by 492 days.

(21) Appl. No.: 13/488,605

(22) Filed: Jun. 5, 2012

(65) Prior Publication Data
US 2013/0323047 A1 Dec. 5, 2013

(51) Int. Cl.
*F01D 25/16* (2006.01)

(52) U.S. Cl.
CPC .............. *F01D 25/16* (2013.01); *F01D 25/162* (2013.01); *F05D 2260/40311* (2013.01)

(58) Field of Classification Search
CPC ..... F01D 25/16; F01D 25/162; F01D 25/164; F01D 2240/50; F01D 2240/52
USPC .................... 415/170.1, 229; 416/174, 244 A
See application file for complete search history.

(56) References Cited

U.S. PATENT DOCUMENTS

| | | | |
|---|---|---|---|
| 4,084,861 A | 4/1978 | Greenberg et al. | |
| 4,867,655 A | 9/1989 | Barbic et al. | |
| 4,952,076 A | 8/1990 | Wiley, III et al. | |
| 4,981,415 A | 1/1991 | Marmol et al. | |
| 5,622,438 A | 4/1997 | Walsh et al. | |
| 5,791,789 A | 8/1998 | Van Duyn et al. | |
| 6,015,264 A * | 1/2000 | Violette et al. | 416/146 A |
| 6,223,616 B1 * | 5/2001 | Sheridan | 74/468 |
| 6,382,905 B1 | 5/2002 | Czachor et al. | |
| 6,439,772 B1 | 8/2002 | Ommundson et al. | |
| 6,881,024 B2 | 4/2005 | Binetruy et al. | |
| 7,322,180 B2 | 1/2008 | Lapergue et al. | |
| 7,322,181 B2 | 1/2008 | Lapergue et al. | |
| 2006/0110244 A1 | 5/2006 | Brault et al. | |
| 2009/0116951 A1 | 5/2009 | Coffin et al. | |
| 2009/0123271 A1 * | 5/2009 | Coffin et al. | 415/142 |
| 2009/0139201 A1 * | 6/2009 | Storace | 60/223 |
| 2011/0123326 A1 * | 5/2011 | DiBenedetto et al. | 415/229 |
| 2011/0130246 A1 * | 6/2011 | McCune et al. | 477/115 |
| 2012/0121378 A1 | 5/2012 | Sheridan et al. | |

FOREIGN PATENT DOCUMENTS

EP 2060809 5/2009

OTHER PUBLICATIONS

International Search Report and Written Opinion for International Application No. PCT/US2013/042812 completed on Sep. 11, 2013.
International Preliminary Report on Patentability for PCT Application No. PCT/US2013/042812, mailed Dec. 18, 2014.

* cited by examiner

*Primary Examiner* — Dwayne J White
*Assistant Examiner* — William Grigos
(74) *Attorney, Agent, or Firm* — Carlson, Gaskey & Olds, P.C.

(57) ABSTRACT

A fan shaft support assembly for a gas turbine engine includes first and second bearing assembles supported by a bearing support structure. The bearing support structure includes a first support including a first support end supporting the first bearing assembly and a second support including a second support end supporting the second bearing assembly. The first support end and the second support end are spaced apart to provide a preload on the first and second bearing assemblies.

17 Claims, 4 Drawing Sheets

FRONT BEARING SUPPORT FOR A FAN DRIVE GEAR SYSTEM

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The high pressure turbine drives the high pressure compressor through an outer shaft to form a high spool, and the low pressure turbine drives the low pressure compressor through an inner shaft to form a low spool. The fan section may also be driven by the low inner shaft. A direct drive gas turbine engine includes a fan section driven by the low spool such that the low pressure compressor, low pressure turbine and fan section rotate at a common speed in a common direction. A speed reduction device such as an epicyclical gear assembly may be utilized to drive the fan section such that the fan section may rotate at a speed different than the turbine section so as to increase the overall propulsive efficiency of the engine.

An epicyclical gear assembly is typically configured to drive a fan shaft supported by a bearing assembly mounted on a fixed support structure. The bearing assembly may include more than one bearing spaced apart from each other a defined distance. It is desirable to provide a preload on the bearing assemblies to maintain contact between bearing surfaces. It is therefore desirable to design and develop biasing structures that provide the desired preload while also reducing variation and simplifying maintenance and assembly.

SUMMARY

A fan shaft support assembly according to an exemplary embodiment of this disclosure, among other possible things includes a first bearing assembly, a second bearing assembly, a first support including a first support end supporting the first bearing assembly, and a second support including a second support end supporting the second bearing assembly, wherein the first support end and the second support end exert a preload on at least one of the first bearing assembly and the second bearing assembly.

In a further embodiment of the foregoing fan shaft support assembly, the preload exerted by the first support and the second support forces the first and second bearing assemblies apart in a direction parallel to an axis of rotation of the fan shaft.

In a further embodiment of any of the foregoing fan shaft support assemblies, the first support end is spaced a distance apart from the second support end.

In a further embodiment of any of the foregoing fan shaft support assemblies, the first and second supports include a thickness in an axial direction that defines the preload.

In a further embodiment of any of the foregoing fan shaft support assemblies, the second support extends from the first support.

In a further embodiment of any of the foregoing fan shaft support assemblies, the first and second supports extend circumferentially about an axis of rotation of the fan shaft.

In a further embodiment of any of the foregoing fan shaft support assemblies, includes a fixed case structure supporting the first and second supports.

In a further embodiment of any of the foregoing fan shaft support assemblies, each of the first bearing assembly and the second bearing assembly comprise an inner race fixed to the fan shaft, an outer race supported on a corresponding one of the first and second support ends and a rolling element disposed between the inner race and the outer race.

In a further embodiment of any of the foregoing fan shaft support assemblies, the first bearing assembly and the second bearing assembly comprise tapered bearing assemblies.

A gas turbine engine according to an exemplary embodiment of this disclosure, among other possible things includes a fan section including a plurality of fan blades and a fan shaft supported for rotation about an axis by a first bearing assembly and a second bearing assembly, a first support including a first support end supporting the first bearing assembly, and a second support including a second support end supporting the second bearing assembly, wherein the first support end and the second support end exert a preload on at least one of the first bearing assembly and the second bearing assembly.

In a further embodiment of the foregoing gas turbine engine, the preload exerted by the first support and the second support forces the first and second bearing assemblies apart in a direction parallel to an axis of rotation of the fan shaft.

In a further embodiment of any of the foregoing gas turbine engines, the first support end is spaced a distance apart from the second support end.

In a further embodiment of any of the foregoing gas turbine engines, the second support extends from the first support.

In a further embodiment of any of the foregoing gas turbine engines, an angle between the first support and the second defines at least a portion of the preload on the first bearing assembly and the second bearing assembly.

In a further embodiment of any of the foregoing gas turbine engines, the first and second supports extend circumferentially about an axis of rotation of the fan shaft.

In a further embodiment of any of the foregoing gas turbine engines, each of the first bearing assembly and the second bearing assembly comprise an inner race fixed to the fan shaft, an outer race supported on a corresponding one of the first and second support ends and a rolling element disposed between the inner race and the outer race.

In a further embodiment of any of the foregoing gas turbine engines, a spacer defines a spacing between the inner races of the first and second bearing assemblies.

In a further embodiment of any of the foregoing gas turbine engines, the first bearing assembly and the second bearing assembly comprise tapered bearing assemblies.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
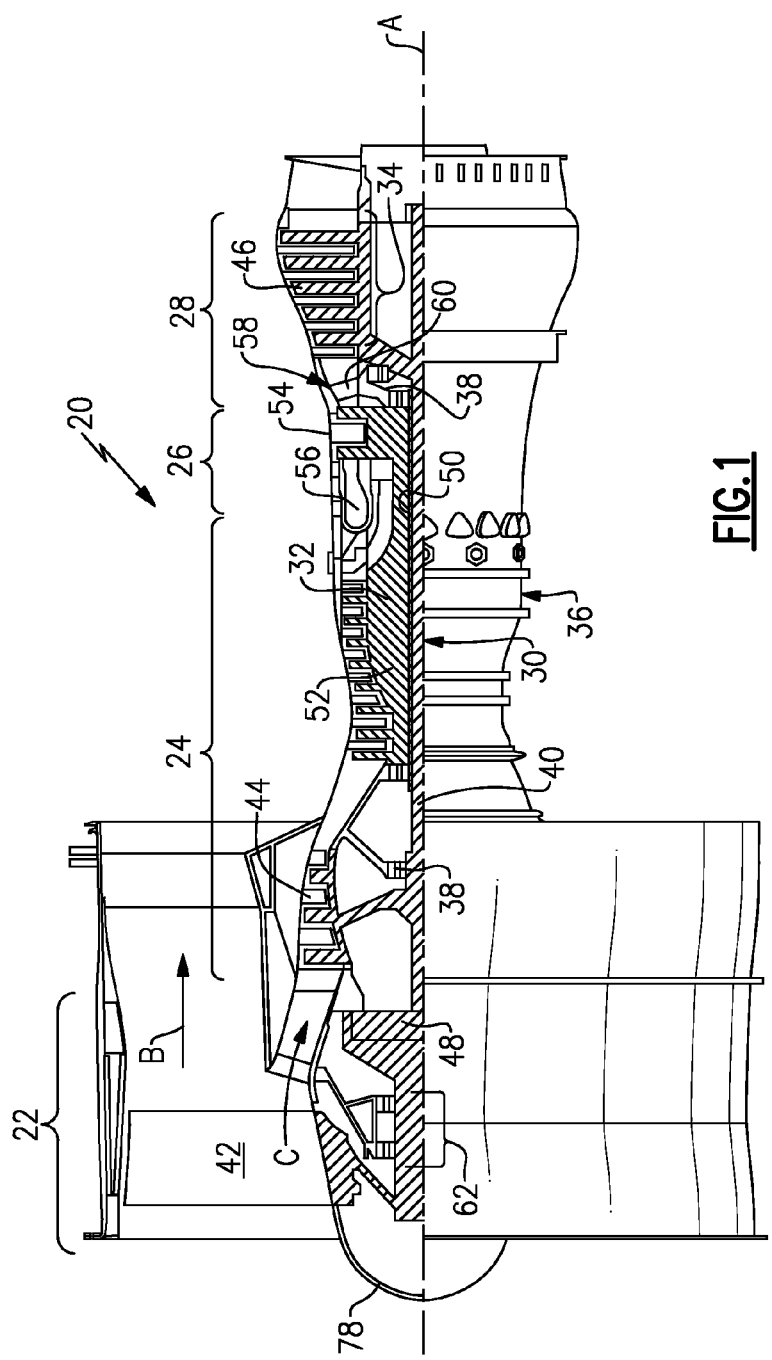
FIG. 1 is a schematic view of an example gas turbine engine.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to the combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\ °R)/518.7)^{0.5}]$. The "Low corrected fan tip speed", as disclosed herein according to one non-limiting embodiment, is less than about 1150 ft/second.

The example gas turbine engine includes the fan 42 that comprises in one non-limiting embodiment less than about 26 fan blades. In another non-limiting embodiment, the fan section 22 includes less than about 20 fan blades. Moreover, in one disclosed embodiment the low pressure turbine 46 includes no more than about 6 turbine rotors schematically indicated at 34. In another non-limiting example embodiment the low pressure turbine 46 includes about 3 turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

The example fan section 22 includes a fan shaft 72 driven by the geared architecture and supported by bearing assembly 62. The fan section further includes a nose cone 78 and fan hub 74 driven by the fan shaft 72.

Figure 2:
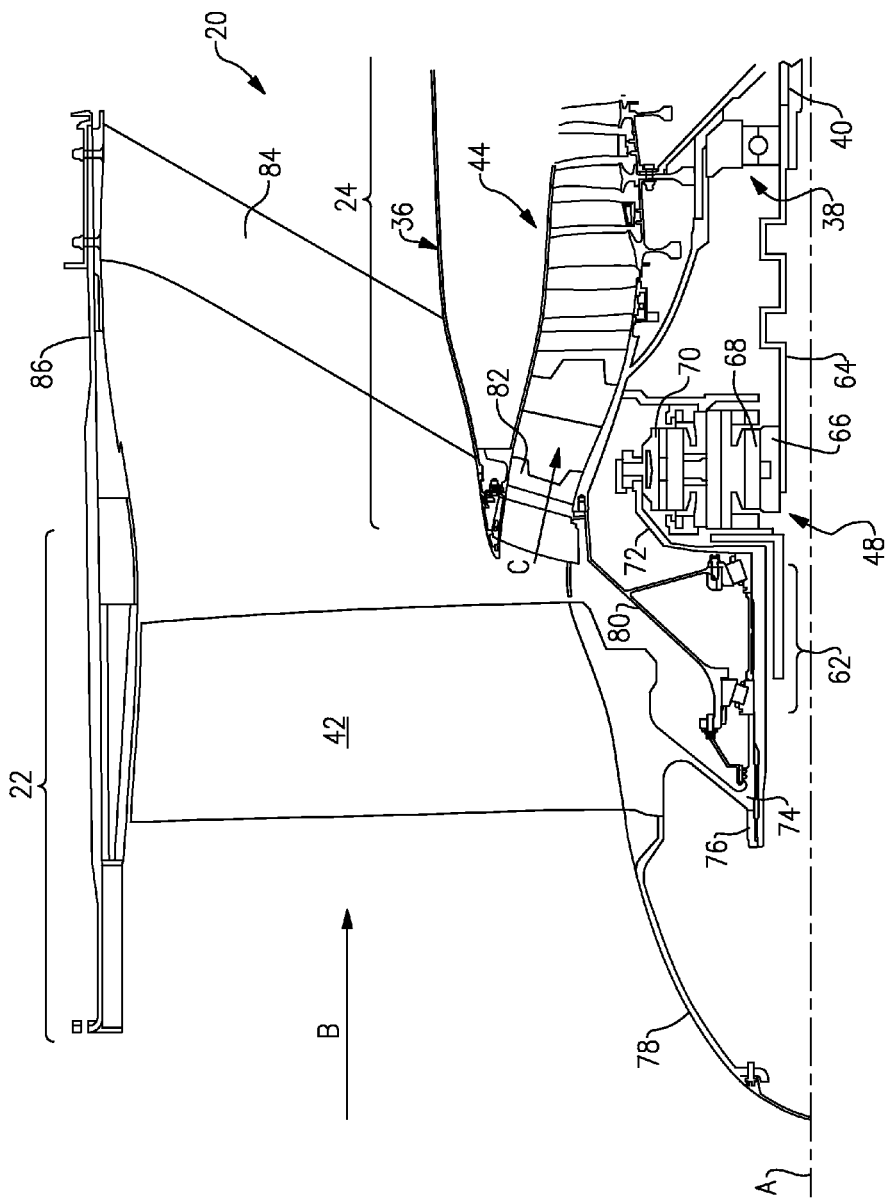
FIG. 2 is a cross-section of an example gas turbine engine front architecture.

Referring to FIG. 2, the example fan section 22 includes the blade 42 that is supported for rotation on the hub 74. The hub 74 is in turn attached to the fan shaft 72. The fan shaft 72 is driven by the geared architecture 48. In this example, the geared architecture 48 includes a sun gear 66 that is driven by a flex shaft 64 that is in turn driven by the inner shaft 40. The example geared architecture 48 includes the sun gear 66 that drives planet gears 68 (only one shown) that in turn drives a ring gear 70. The ring gear 70 is attached to drive the fan shaft 72 about the axis A.

The fan shaft 72 is supported by a bearing support 80. In this example, the bearing support 80 supports the bearing assembly 62. The bearing support 80 is attached to a fixed vane 82 that is disposed at an inlet of the low pressure compressor 44. The fixed vane 82 is in turn supported by one of a plurality of fan exit guide vanes 84. The guide vanes 84 extend through the bypass flow path B from the fixed vane 82 and static structure provide by the engine case 36 to fan case 86. As appreciated, the fan case 86, exit guide vane 84, and engine case 36 are all fixed structures that support the rotating fan shaft 72.

The example fan section 22 also includes the fan nose 78 that rotates along with the fan hub 74. The fan hub 74 is connected to the fan shaft 72 through a splined interface 75 and held axially in place by threaded member 76. In this example, the threaded member 76 comprising a nut received on the end of the fan shaft 72. A seal support 96 is attached to the support 80 and engages sealing features 98 supported on the fan hub 74.

Figure 3:
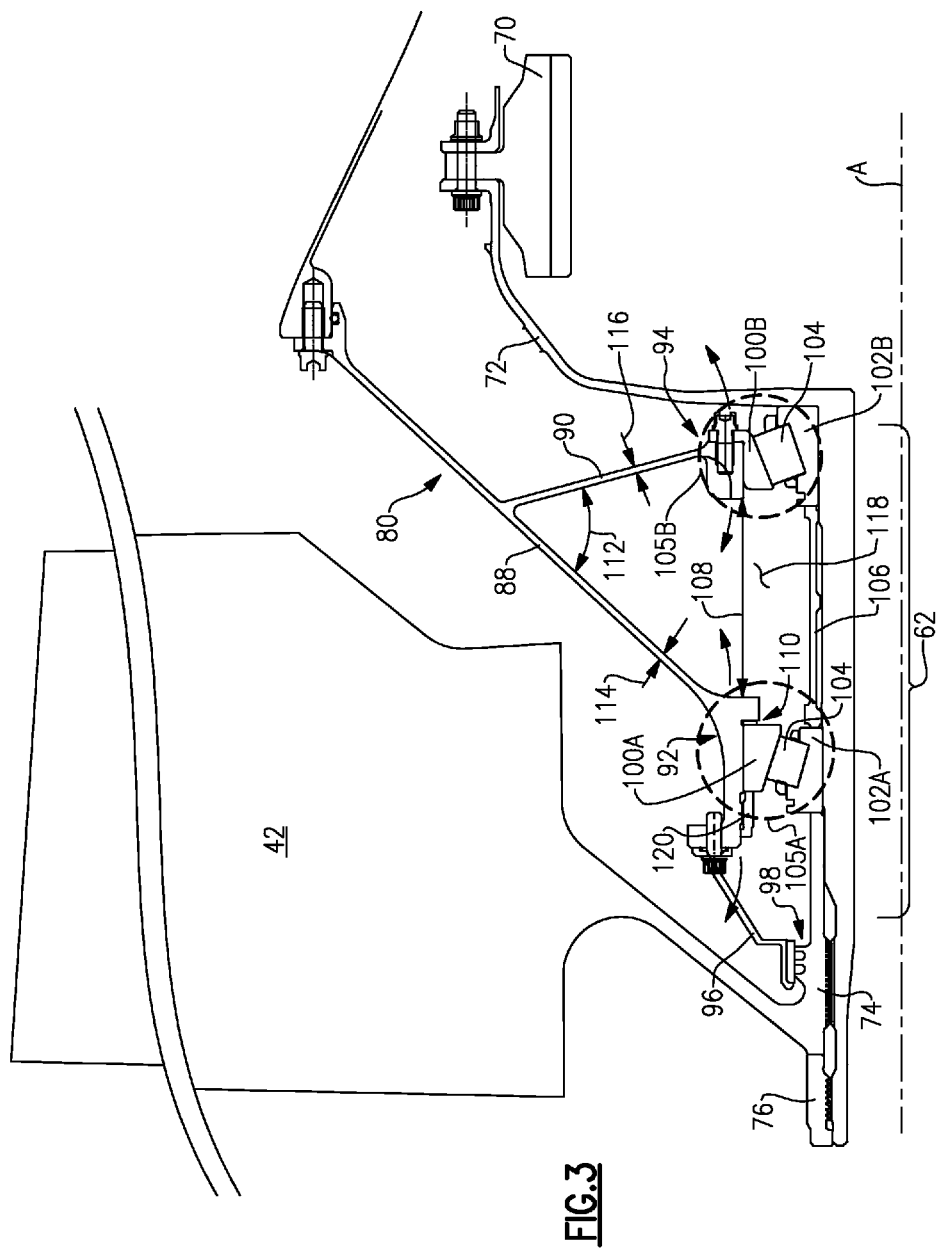
FIG. 3 is a cross-section on an example fan shaft bearing support.

Referring to FIG. 3, the example bearing support 80 includes a first support leg 88 and a second support leg 90. The second support leg 90 extends from the first support let 88 to second end 94. The first support let 88 extends to a first end 92. The example bearing assembly 62 is disposed within a bearing compartment 118 that maintains a desired quantity of lubricant (not shown) to provide the desired cooling and lubrication.

In this example, the bearing assembly 62 includes a first tapered bearing assembly 105A and a second tapered bearing assembly 105B. Each of the tapered bearing assemblies 105A, 105B includes an outer race 100a, 100b, an inner race 102a, 102b and rolling elements 104. In this example, the rolling element 104 is disposed between the inner race 102a, 102b and the outer races 100a, 100b. Each of the inner races 102b and 102a are pressed fit to the fan shaft 72 such that they are substantially restricted from relative axial and radial movement.

The first and second tapered bearings 105a and 105b are spaced apart from each other a distance defined by a spacer 106. Each of the tapered bearing assemblies 105a and 105b require a preload to maintain contact between the upper and lower races and the rolling elements 104. In this example, the preload is provided by the first support leg 88 and the second support leg 90. The ends 92 and 94 are spaced apart a distance 108 but are not connected to one another. Accordingly, the first end 92 and the second end 94 are free to move relative to one another and do not include a direct connection there between.

The example tapered bearing assembly 62 is assembled by inserting the various components onto the fan shaft 72 and then securing and loading the components in a stacked configuration with the nut 76. Accordingly, assembly proceeds by inserting the second inner race 102b onto the fan shaft 72 such that it abuts a shoulder 115 of the fan shaft 72. Once the second inner race 102b is abutted against the shoulder 115; spacer 106 is inserted and abutted against the inner race 102b. The spacer 106 defines the desired spacing between the first tapered bearing assembly 105a and the second bearing assembly 105b. The spacer 106 also provides and defines the desired preload by setting the distance between the tapered bearing assemblies 105a, 105b.

Once the spacer 106 is in place, the first inner race 102a is inserted onto the fan shaft 72 and abutter against the spacer 106. Following the first inner race 102a is the fan hub 74. The fan hub 74 slides onto the fan shaft 72 and is engaged with the splined interface 75 such that the hub 74 will rotate with the fan shaft 72. The nut 76 is then threaded onto the end of the fan shaft 72 to a desired torque that defines the desired preload on the bearing assemblies 105a, 105b.

Because the bearing support 80 includes the first leg 88 and the second leg 90 that are spaced a distance 108 from each other a required preload is provided by the bearing support 80 without additional preload structures. The first end 92 that supports the first bearing assembly 105a and the second end 94 that supports the second bearing assembly are movable relative to each other and biased outwardly along the axis in a direction away from each other. This outward bias and relative flexibility provides for the application of the preload on the tapered bearing assemblies 105a, 105b.

The preload provided by the bearing support 80 in this first support leg 88 and the second support leg 90 is defined by the mechanical material properties of the bearing support along with the angle 112 and thicknesses 114 and 116 of each of the bearing support legs 88, 90. The application of force provided by the nut 76 compresses the legs 88, 90 of the bearing support 80 and thereby applies the desired preload on the first and second tapered bearing assemblies 105a, 105b.

The example bearing support 80 utilizes the spring rate between the first end portion 92 and the second end portion 94 to set the preload required for the tapered bearing assemblies 105a, 105b. The example preload is defined by the angle 112 along with the thicknesses 114 and 116 of the first and second supports 88, 90. The material properties of the bearing support 80 also determine the desired preload for applied to the tapered bearing assemblies 105a, 105b.

The first tapered bearing assembly 105a and specifically the upper race 100a is spaced apart from a shoulder of the first end portion 92 by a spacer 110. The spacer 110 provides an adjustment of the preload exerted on the first and second bearing assemblies 105a and 105b by setting a distance therebetween. The outer race 100a is supported and held in place between the spacer 110 and a holding member 120. The holding member 120 holds the outer race 100a against the spacer 110.

As appreciated, because the first end 92 and the second end 94 are spaced apart from each other they are free to move relative to each other and therefore provide for the application of preload on the first and second tapered bearing assemblies 105a, 105b. Moreover, no other features are required to provide the desired preload.

The bearing support 80 is disposed annularly about the axis A and therefore so is the first support leg 88 and the second support leg 90. In this example, the second support leg 90 extends from the first support leg 88 to the second end 94. The angle 112 along with the thicknesses 114 and 116 and material properties utilize for fabrication of the bearing support 80 and define the desired spring rate that exerts the desired preload once the hub and fan section 22 are assembled to the fan shaft 72.

Figure 4:
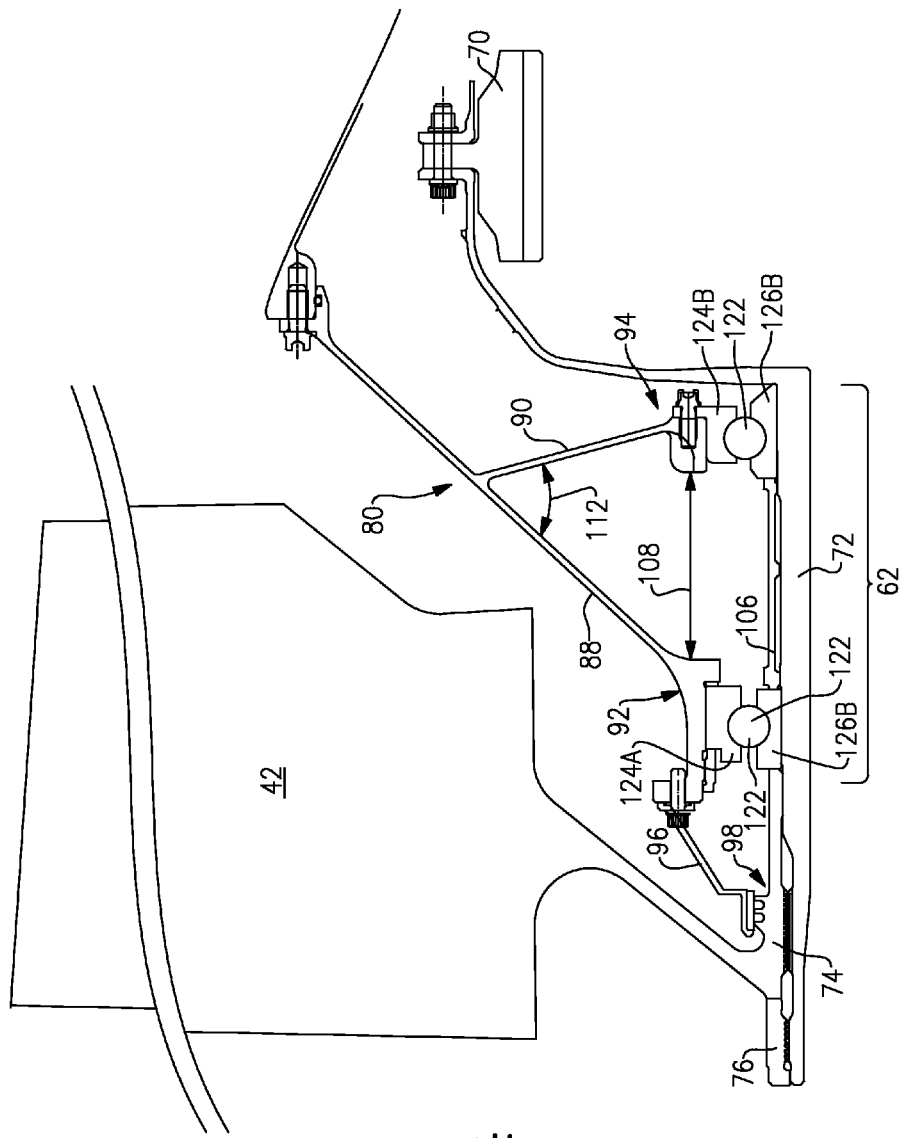
FIG. 4 is a cross-section of another fan shaft bearing support.

Referring to FIG. 4, in another example embodiment, the bearing assembly 62 that supports rotation of the fan shaft 72 comprises first and second ball bearings 125a and 125b. The first and second roller ball bearings include the outer race 124a and 124b, rolling elements 122, inner races 126a and 126b. In this example, the roller elements 122 are disposed between the inner and outer races 126a, 126b, 124a, 124b and provide the desired support for rotation of the fan shaft 72.

As appreciated, the example bearing support 80 includes the first and second spaced apart ends 92 and 94 that provide the preload without additional and specifically dedicated biasing members. Accordingly, the example the bearing support 80 provides the desired preload without additional parts and/or complex geometries.

Although an example embodiment has been disclosed, a worker of ordinary skill in this art would recognize that certain modifications would come within the scope of this disclosure. For that reason, the following claims should be studied to determine the scope and content of this disclosure.

The invention claimed is:

1. A fan shaft support assembly comprising:
a first bearing assembly;
a second bearing assembly spaced axially apart from the first bearing assembly;
a first support including a first support end disposed on a first support leg supporting the first bearing assembly, wherein the first support end is connected only to the first support leg; and
a second support including a second support end disposed on a second support leg supporting the second bearing assembly, wherein the second support end is connected only to the second support leg and the first support end exerts an axial preload on the first bearing assembly and the second support end exerts an axial preload on the second bearing assembly.

2. The fan shaft support assembly as recited in claim 1, wherein the preload exerted by the first support and the second support forces the first and second bearing assemblies apart in a direction parallel to an axis of rotation of the fan shaft.

3. The fan shaft support assembly as recited in claim 1, wherein the first support end is spaced a distance apart from the second support end.

4. The fan shaft support assembly as recited in claim 1, wherein the first and second supports includes a thickness in an axial direction that defines the preload.

5. The fan shaft support assembly as recited in claim 1, wherein the second support extends from the first support.

6. The fan shaft support assembly as recited in claim 1, wherein the first and second supports extend circumferentially about an axis of rotation of the fan shaft.

7. The fan shaft support assembly as recited in claim 1, including a fixed case structure supporting the first and second supports.

8. The fan shaft support assembly as recited in claim 1, wherein each of the first bearing assembly and the second bearing assembly comprise an inner race fixed to the fan shaft, an outer race supported on a corresponding one of the first and second support ends and a rolling element disposed between the inner race and the outer race.

9. The fan shaft support assembly as recited in claim 1, wherein the first bearing assembly and the second bearing assembly comprise tapered bearing assemblies.

10. A gas turbine engine comprising:
a fan section including a plurality of fan blades and a fan shaft supported for rotation about an axis by a first bearing assembly and a second bearing assembly;
a first support including a first support leg and a first support end supporting the first bearing assembly, wherein the first support end is supported only by the first support leg; and
a second support including a second support leg and a second support end supporting the second bearing assembly, wherein the second support end is supported only by the second support leg and the first support end and the second support end exert a preload on at least one of the first bearing assembly and the second bearing assembly, wherein the preload exerted by the first support and the second support forces the first and second bearing assemblies apart in a direction parallel to an axis of rotation of the fan shaft.

11. The gas turbine engine as recited in claim 10, wherein the first support end is spaced a distance apart from the second support end.

12. The gas turbine engine as recited in claim 10, wherein the second support extends from the first support.

13. The gas turbine engine as recited in claim 12, including an angle between the first support and the second defining at least a portion of the preload on the first bearing assembly and the second bearing assembly.

14. The gas turbine engine as recited in claim 10, wherein the first and second supports extend circumferentially about an axis of rotation of the fan shaft.

15. The gas turbine engine as recited in claim 10, wherein each of the first bearing assembly and the second bearing assembly comprise an inner race fixed to the fan shaft, an outer race supported on a corresponding one of the first and second support ends and a rolling element disposed between the inner race and the outer race.

16. The gas turbine engine as recited in claim 15, including a spacer defining a spacing between the inner races of the first and second bearing assemblies.

17. The gas turbine engine as recited in claim 10, wherein the first bearing assembly and the second bearing assembly comprise tapered bearing assemblies.

* * * * *